United States Patent
Eads

(10) Patent No.: US 8,479,760 B2
(45) Date of Patent: Jul. 9, 2013

(54) AIR CONDITIONER WATER PAN DRAIN LINE SYSTEM

(75) Inventor: Christopher A. Eads, Longwood, FL (US)

(73) Assignee: Easy Solutions Technologies, Inc., Longwood, FL (US)

(*) Notice: Subject to any disclaimer, the term of this patent is extended or adjusted under 35 U.S.C. 154(b) by 472 days.

(21) Appl. No.: 12/828,187

(22) Filed: Jun. 30, 2010

(65) Prior Publication Data

US 2012/0000233 A1 Jan. 5, 2012

(51) Int. Cl.
*B08B 9/032* (2006.01)
*F25B 47/00* (2006.01)

(52) U.S. Cl.
USPC ......... 137/240; 138/114; 285/133.11; 62/303

(58) Field of Classification Search
USPC . 137/238, 240; 138/114; 285/133.11; 62/303
See application file for complete search history.

(56) References Cited

U.S. PATENT DOCUMENTS

| | | | |
|---|---|---|---|
| 4,962,778 A | 10/1990 | Driskill | |
| 5,085,244 A * | 2/1992 | Funk | 137/240 |
| 5,123,627 A | 6/1992 | Hodges | |
| 5,722,458 A | 3/1998 | Potter | |
| 6,182,677 B1 | 2/2001 | Pignataro | |
| 6,427,458 B1 | 8/2002 | Fowler | |
| 6,701,740 B1 | 3/2004 | Hernandez-Zelaya | |
| 6,708,717 B1 | 3/2004 | Coogle | |
| 7,448,405 B2 * | 11/2008 | Shores | 137/240 |
| 7,624,756 B1 * | 12/2009 | Coogle | 137/240 |
| 2006/0096307 A1 | 5/2006 | Coogle | |
| 2009/0056346 A1 | 3/2009 | Zatarain | |

* cited by examiner

*Primary Examiner* — Kevin Lee
(74) *Attorney, Agent, or Firm* — Michael L. Leetzow, P.A.

(57) ABSTRACT

A system is provided for cleaning out a drain line for an air conditioning unit. The system has an access member that can be installed and remain in the drain line. The access unit provides access to the drain line to allow a fluid to move in at least one direction to remove the debris and liquids from the drain line to prevent maintenance issues with the air conditioning unit. A connecting member is used with the access member to move the debris either down the drain line or out of the air conditioning unit.

16 Claims, 6 Drawing Sheets

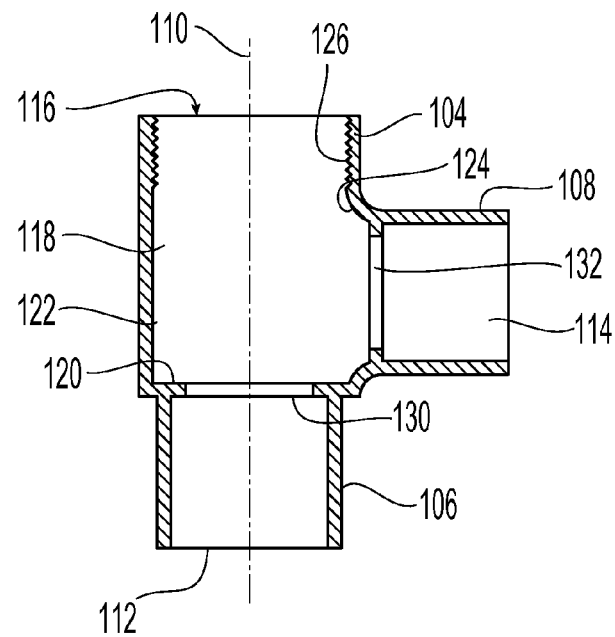
*Fig. 5*
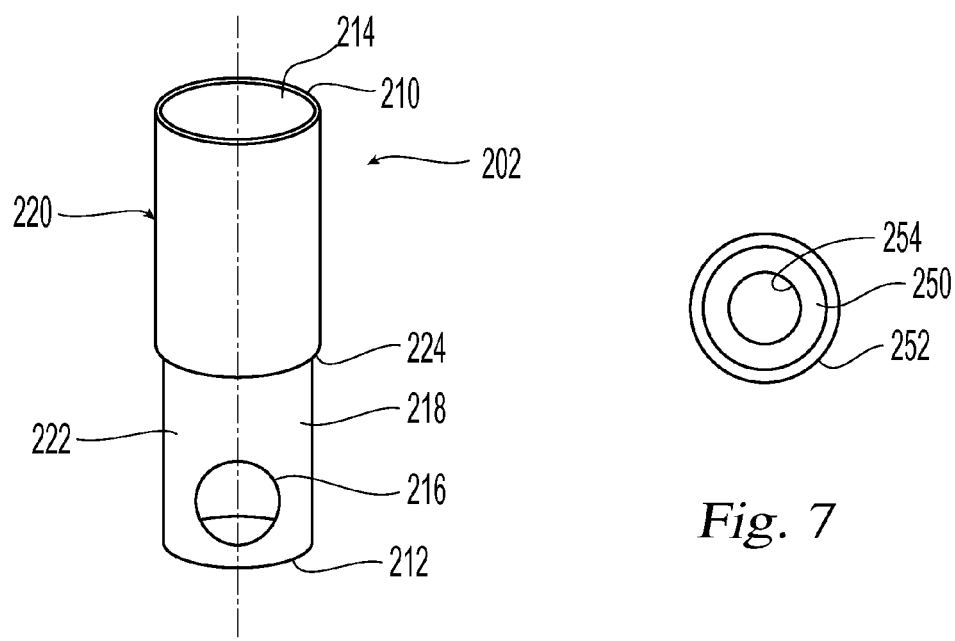
*Fig. 6*
*Fig. 7*

AIR CONDITIONER WATER PAN DRAIN LINE SYSTEM

BACKGROUND OF THE INVENTION

1. Field of the Invention

The present invention relates to a system and access member for cleaning out a drain line associated with an air conditioner water pan drain.

2. Technical Background

Air conditioners, given the way they work, create condensation that is typically collected at the bottom of the unit in a water pan. The water pan is usually connected to a drain line that exits from the air conditioner (A/C) unit and runs to the outside of the house or building where the A/C unit is installed. Sometimes the length of the drain line can be substantial. As a result, the drain line can remain wet for months, particularly in hot and humid areas, where the A/C unit can run most of the year. As a result of the constant wetness and opening to the outdoors, the drain line can become clogged or impeded by the growth of algae, mold, or fungi, or the accumulation of other particles and debris, including insects, frogs, lizards and the like. If the water pan becomes full and can not drain to the accumulation of debris in the drain line, the A/C unit will cause the water to overflow causing water damage or, if equipped with an overflow protection device, will shut itself off, causing the building's inhabitants to become uncomfortable very quickly. Therefore, it is important to be able to clear the drain line and empty the water pan.

Gaining access to the drain line can be very difficult, time consuming and the access points may not allow for a proper cleaning. In fact, in some instances, the materials in the drain line may be blown into the A/C unit, thereby fouling the A/C unit and potentially causing other maintenance and cleanliness issues, if not damaging the A/C unit as well.

It would be beneficial to have an access point in the drain line that allows for removal of the debris from the line as well as the A/C unit and water pan. The access point should be easily accessible for the technician or building owner to be able to quickly and reliably remove the debris on an emergency basis or as a part of a scheduled maintenance program.

SUMMARY OF THE INVENTION

In one aspect, an air conditioner water pan drain line system to clean out a drain line includes an access member configured to be disposed within the air conditioner water pan drain line, the access member having a sealable opening therein, and at least one connecting member, the at least one connecting member configured to be sealingly inserted into the sealable opening of the access member and having a first opening at a top end and a second opening adjacent a bottom end, the top end connectable to a fluid moving device for moving a fluid through the connecting member in at least one direction.

In some embodiments, the system also includes an adapter to sealingly engage the first opening of the at least one connecting member, the adapter having a threaded top opening to engage a fluid delivering device.

In other embodiments, the access member is generally T-shaped, the access member has two arms and one leg, the two arms lying in a generally straight line and the leg being perpendicular to and between the two arms, one of the two arms and the leg configured to be connected to the drain line, the other of the two arms having the sealable opening to receiving the at least one connecting member.

In yet other embodiments, the at least one connecting member is configured to receive a vacuum hose in the first opening and the second opening is in a sidewall thereof, the second opening of the at least one connecting member configured to align with leg of the access member to suck material out of the drain line between the system and an air conditioning unit.

In yet another embodiment, an access member for a drain line includes a main body having a first chamber, a first opening, a second opening, and a third opening, the first chamber having a longitudinal axis, the longitudinal axis passing through the first and second openings and being orthogonal to the third opening, a generally first cylindrical extension having a first end, a second end, and an opening extending therebetween, the second end opening into the first chamber at the second opening and being in fluid communication therewith, and a second generally cylindrical extension integral with the main body and having a opening extending therethrough and in fluid communication with the first chamber, wherein the first chamber has an upward facing surface extending around a periphery of the first chamber adjacent the second opening to provide a stop and seal for a connecting member.

In another embodiment, An air conditioner water pan drain line system to clean out a drain line includes an access member configured to be disposed within the air conditioner water pan drain line, the access member being generally T-shaped, the access member having two arms and one leg, the two arms lying in a generally straight line and the leg being perpendicular to and between the two arms, one of the two arms and the leg configured to be connected to the drain line, the other of the two arms having a sealable opening, at least one connecting member, the at least one connecting member configured to be sealingly inserted into the sealable opening of the access member and having a first opening at a top end and a second opening adjacent a bottom end.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 5 is a cross-sectional view of the access member of FIG. 2;

FIG. 6 is a front perspective view of one embodiment of a connecting member according to the present invention;

FIG. 7 is a top view of another embodiment of a connecting member according to the present invention;

DETAILED DESCRIPTION OF THE PREFERRED EMBODIMENTS

Figure 1:
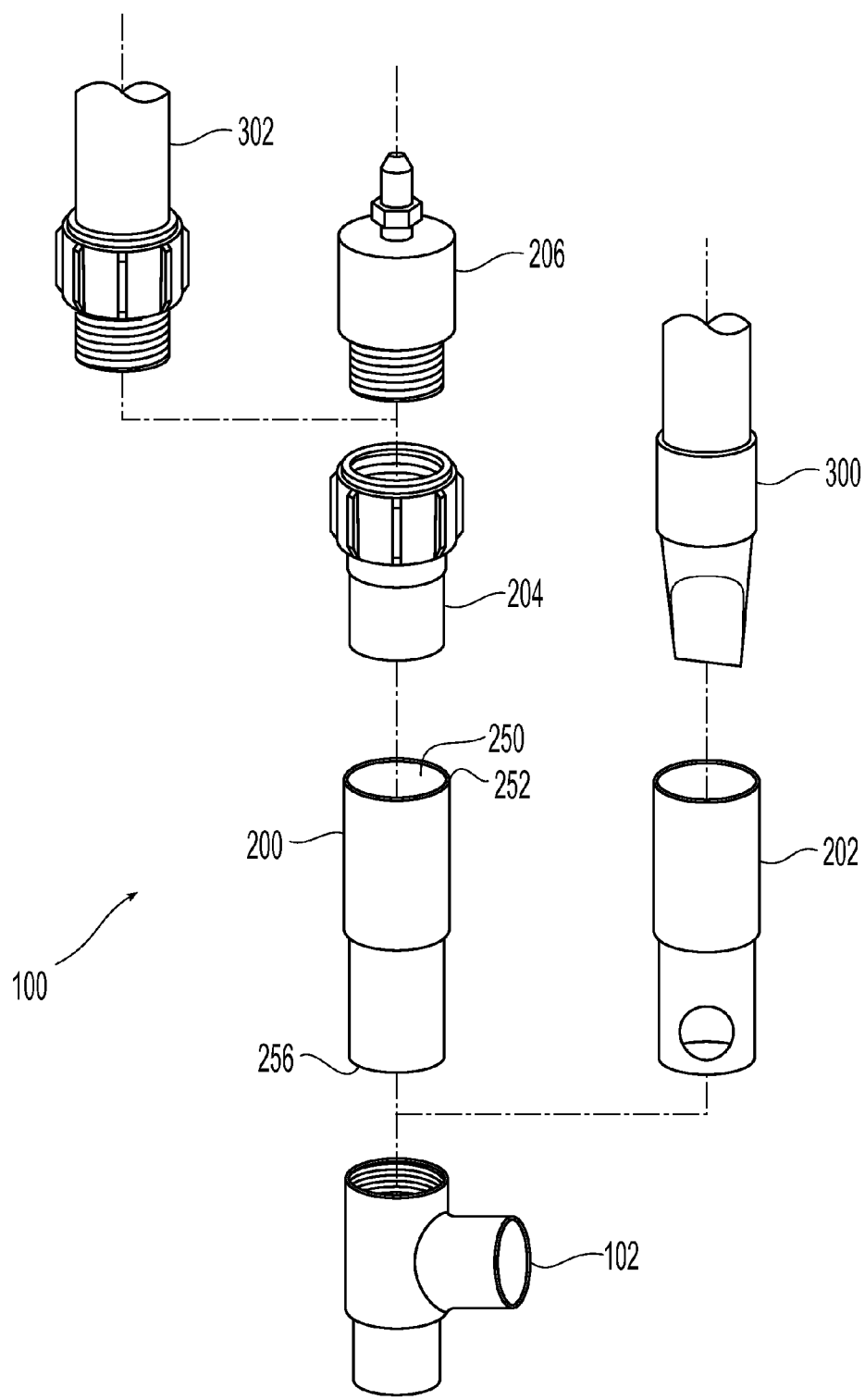
FIG. 1 is a schematic illustration of one embodiment of a water pan drain line system to clean out a drain line according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
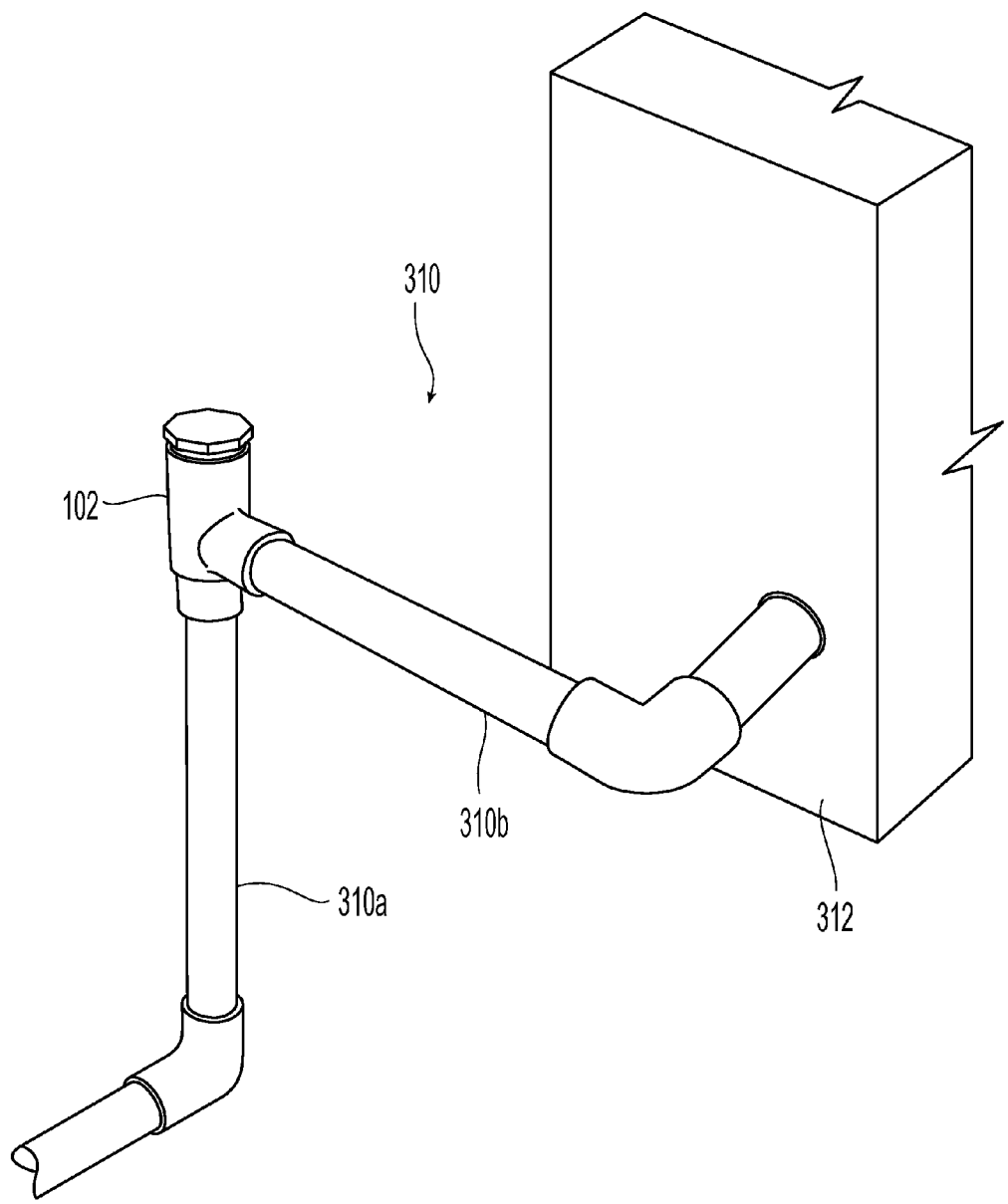
FIG. 2 illustrates one embodiment of an access member according to the present invention installed in a drain line.

Referring to FIG. 1, an air conditioner water pan drain line system 100 to clean out a drain line is illustrated. The system 100 includes an access member 102 and connecting members 200, 202, which can be inserted into the access member 102. Connecting member 200 also may be used with an adapter 204 and also a compressed gas adapter 206. The air conditioner water pan drain line system 100 is then used with a fluid moving device, which may be one of several different devices. The fluid moving device may be a vacuum 300, which is used with connecting member 202, or it may be a water hose 302 that is coupled to the adapter 204. Alternatively, the fluid moving device may be a compressed air hose/source that is connected to the compressed gas adapter 206, which in turn is connected to the adapter 204. As illustrated in FIG. 2, the air conditioner water pan drain line system 100 is connected to the drain line 310 of an air conditioner 312.

Figure 3:
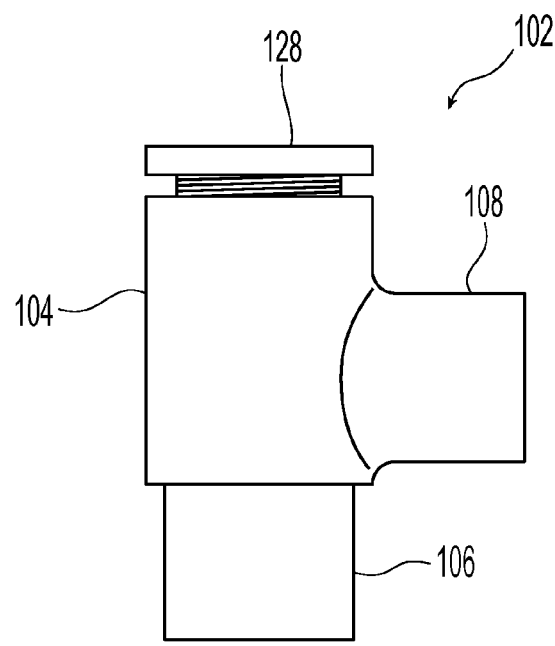
FIG. 3 is a side elevation view of the access member of FIG. 2.
Figure 4:
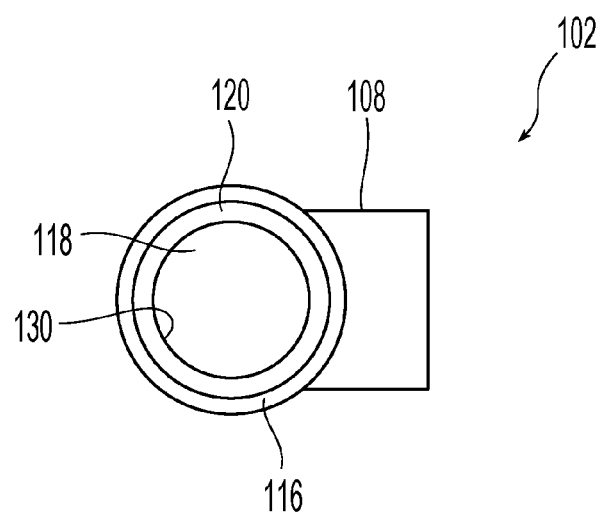
FIG. 4 is a top view of the access member of FIG. 2.
Figure 8:
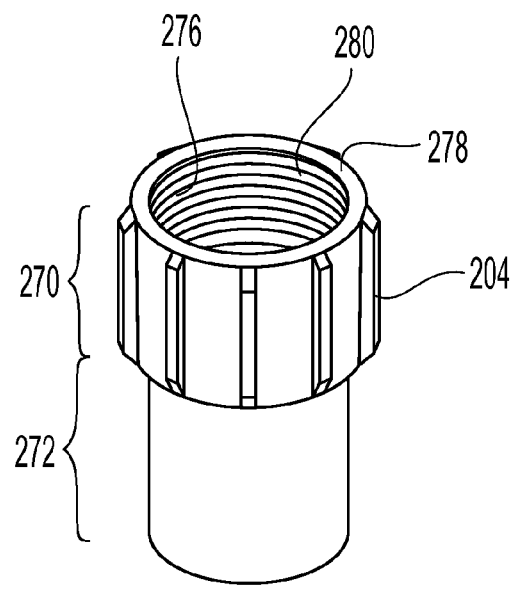
FIG. 8 is a front perspective view of an embodiment of an adapter according to the present invention.
Figure 9:
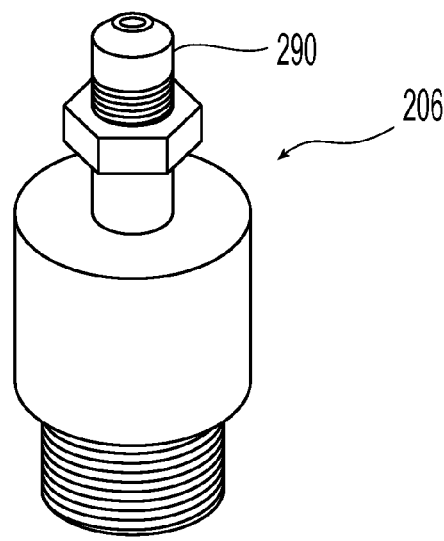
FIG. 9 is a front perspective view of an embodiment of an compressed gas adapter according to the present invention.

Referring to FIGS. 3-5, the access member 102 has two arms 104,106 and one leg 108. The two arms 104,106 generally lie in a straight line along a longitudinal axis 110. The leg 108 is generally perpendicular to and disposed between the two arms 104,106. Arm 106 has an opening 112 and is configured to be connected to one portion 310a of the drain line 310, the portion 310a extending from the access member 102 to an end of the drain line. The leg 108 has an opening 114 and is configured to be connected to a portion 310b of the drain line 310, the portion 310b extending between the access member 102 and the air conditioner 312. See FIG. 2. The arm 104 has a sealable opening 116 allowing access to and use of the air conditioner water pan drain line system 100. The sealable opening 116 opens into a first chamber 118, which as illustrated in FIG. 5, shares the longitudinal axis 110. The first chamber 118 has an upward facing surface 120 extending around the periphery 122 thereof. As discussed in more detail below, the upward facing surface 120 provides a stop for, and a seal with, the connecting members 200, 202. The inside surface 124 of the first chamber 118 is preferably threaded adjacent the opening 116. The threaded portion 126 cooperates with a cap 128 to seal the access member 102 when the air conditioner water pan drain line system 100 is not in use. Alternatively, the inside surface 124 of the first chamber 118 may be smooth and a non-threaded cap may be used to seal the sealable opening 116 by a friction fit.

The arm 106 also has an opening 130 into the first chamber 118 to allow the first chamber 118 and the connecting member 200 to be in fluid communication with the arm 106 and one portion 310a of the drain line 310. Similarly, the leg 108 has an opening 132 into the first chamber 118 to allow the first chamber 118 and the connecting member 202 to be in fluid communication with the leg 108 and the other portion 310b of the drain line 310.

Turning now to FIG. 6, connecting member 202 has a top end 210 and a bottom end 212. The connecting member 202 has a first opening 214 at the top end 210 and a second opening 216 in the bottom end 212. The second opening 216 opens through the side wall 218 of the connecting member 202 adjacent the bottom end 212. The connecting member 202 also has a top portion 220 and a bottom portion 222. A downward facing surface 224 separates the top portion 220 in the bottom portion 222. The bottom portion 222 is configured to fit within the first chamber 118 and to preferably engage the inside surface 124 thereof. The bottom end 212 of the connecting member 202 is preferably sealed such that the bottom end 212 contacts the upward facing surface 120 to seal the opening 130 of the arm 106. While not necessary, the downward facing surface 224 may also make contact with the top of the arm 104 to provide an even better seal.

When the connecting member 202 is inserted into the sealable opening 116 of the access member 102, the second opening 216 is aligned with the opening 132 of the leg 108. As illustrated in FIG. 1, a vacuum 300 (or other suction device) is inserted into the first opening 214 of the connecting member 202. With reference to FIG. 2, the vacuum 300 would be in fluid communication with the air conditioner 312 through the drain line 310b. The vacuum 300 would then be able to suction any debris and/or fluid from the drain line 310 and from within the air-conditioner 312 adjacent to the drain line 310b.

To clean out the other portion 310a of the drain line 310 (from the access member 102 to the end of the drain line 310), connecting member 200 is inserted into the sealable opening 116 of the access member 102. Connecting member 200 is similar to connecting member 202, but has its second opening at the bottom end of the connecting member rather than in a side wall. More specifically and as best illustrated in FIGS. 1 and 7, the connecting member 200 has an opening 250 at the top end 252 and a bottom opening 254 at the bottom end 256. When the connecting member 200 is inserted into the first chamber 118, the bottom end 256 makes contact with the upward facing surface 120. As a result, the opening 130 of arm 106 and the attached drain line 310 are in fluid communication with the connecting member 200. Simultaneously, the opening 132 of arm 108 is blocked from being in fluid communication with connecting member 200.

Adapter 204 is inserted into the opening 250 at the top end 252 of the connecting member 200. The adapter 204 has an upper portion 270 and a lower portion 272. The lower portion 272 fits with in the opening 250, preferably by a friction fit. Alternatively, the interior portion of connecting member 200 adjacent the opening 250 at the top end 252 and the outer surface of the lower portion 272 of the adapter 204 may be threaded for a more secure connection.

The inner surface 276 of the upper portion 270 is preferably threaded adjacent the opening 278. The threads 280 engage the threads of a water hose 302 or the threads of the compressed gas adapter 206. Once connected to the adapter 204, the water hose 302 can deliver water as a fluid to clean out the drain line 310 from the access member 102 to the end of the drain line 310. With the opening 132 of leg 108 sealed off, the water will not enter the air conditioning unit and cause problems with water entering, including pushing debris into the A/C unit 312 or get components wet that should not be wet.

Connecting member 200 may also be used with the vacuum 300 to clean out the drain line 310. For example, the vacuum 300 can be used to force air into the connecting member 200 and the drain line 310 to push the debris and water out. In some circumstances, it may also be advantageous to suction the debris out of the drain line 310 through the connecting member 200 as well.

Alternatively, the compressed gas adapter 206 can be threaded into the opening 278 of the adapter 204. The compressed gas adapter 206 had a nipple 290 that can be attached to a source of compressed gas. The compressed gas can include nitrogen, compressed air, compressed carbon dioxide, or any other appropriate compressed gas. The compressed gas is the fluid that pushes debris and water out the drain line 310 from the access member 102 to the end of the drain line 310.

Figure 10:
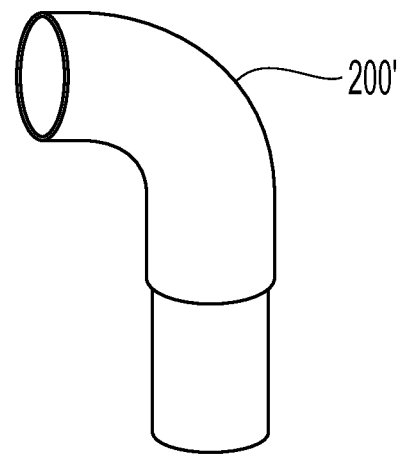
FIG. 10 is a front perspective view of alternative embodiment of a connecting member according to the present invention.
Figure 11:
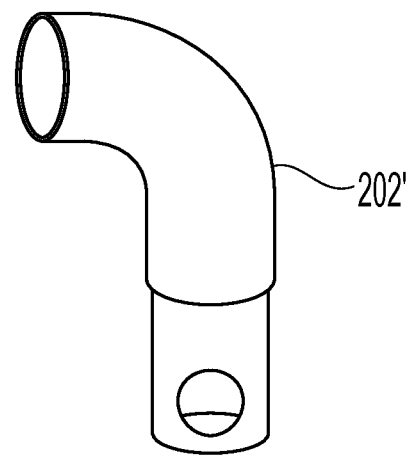
FIG. 11 is a front perspective view of alternative embodiment of a connecting member according to the present invention.

Alternatively as illustrated in FIGS. 10 and 11, the connecting members 200' and 202' can be oriented at an angle of about 90° for those areas where the access to the drain line 210 can be limited.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

I claim:

1. An air conditioner water pan drain line system to clean out a drain line comprising:
   an access member configured to be disposed within the air conditioner water pan drain line, the access member having a sealable opening therein; and
   at least one connecting member, the at least one connecting member configured to be sealingly inserted into the sealable opening of the access member and having a first opening at a top end and a second opening adjacent a bottom end, the top end connectable to a fluid moving device for moving a fluid through the connecting member in at least one direction.

2. The air conditioner water pan drain line system according to claim 1, further comprising an adapter to sealingly engage the first opening of the at least one connecting member, the adapter having a threaded top opening to engage a fluid delivering device.

3. The air conditioner water pan drain line system according to claim 1, wherein the at least one connecting member is generally cylindrical and has a longitudinal axis, the first and second openings disposed along the longitudinal axis.

4. The air conditioner water pan drain line system according to claim 1, wherein the at least one connecting member is generally cylindrical and has a longitudinal axis, the second opening disposed in a sidewall and generally perpendicular to the longitudinal axis.

5. The air conditioner water pan drain line system according to claim 1, wherein the access member is generally T-shaped, the access member having two arms and one leg, the two arms lying in a generally straight line and the leg being perpendicular to and between the two arms, one of the two arms and the leg configured to be connected to the drain line, the other of the two arms having the sealable opening to receiving the at least one connecting member.

6. The air conditioner water pan drain line system according to claim 5, wherein the at least one connecting member is configured to receive a vacuum hose in the first opening and the second opening is in a sidewall thereof, the second opening of the at least one connecting member configured to align with leg of the access member to suck material out of the drain line between the system and an air conditioning unit.

7. The air conditioner water pan drain line system according to claim 5, wherein the at least one connecting member is configured to receive one of a water hose and a compressed nitrogen hose in the first opening and the second opening is in fluid communication with the one of the two arms and the air conditioner water pan drain line to blow material out of the drain line between the system and an end of the drain line.

8. The air conditioner water pan drain line system according to claim 1, wherein the at least one connecting member is generally cylindrical and bends through an angle of about 90°.

9. The air conditioner water pan drain line system according to claim 2, wherein the fluid delivering device is one of a water hose and a compressed gas hose to allow fluid to move from the assembly to an end of the drain line.

10. The air conditioner water pan drain line system according to claim 2, wherein the fluid is water.

11. The air conditioner water pan drain line system according to claim 2, wherein the fluid is selected from the group of fluids including nitrogen, carbon dioxide, and compressed air.

12. An air conditioner water pan drain line system to clean out a drain line comprising:
    an access member configured to be disposed within the air conditioner water pan drain line, the access member being generally T-shaped, the access member having two arms and one leg, the two arms lying in a generally straight line and the leg being perpendicular to and between the two arms, one of the two arms and the leg configured to be connected to the drain line, the other of the two arms having a sealable opening;
    at least one connecting member, the at least one connecting member configured to be sealingly inserted into the sealable opening of the access member and having a first opening at a top end and a second opening adjacent a bottom end.

13. The air conditioner water pan drain line system according to claim 12, wherein the at least one connecting member is configured to receive a vacuum hose in the first opening and the second opening is in a sidewall thereof, the second opening of the at least one connecting member configured to align with leg of the access member to suck material out of the drain line between the system and an air conditioning unit.

14. The air conditioner water pan drain line system according to claim 12, wherein the at least one connecting member is configured to receive one of a water hose and a compressed gas hose in the first opening and the second opening is in fluid communication with the one of the two arms and the air conditioner water pan drain line to blow material out of the drain line between the system and an end of the drain line.

15. The air conditioner water pan drain line system according to claim 12, further comprising an adapter to sealingly engage the first opening of the at least one connecting member, the adapter having a threaded top opening to engage a fluid delivering device.

16. The air conditioner water pan drain line system according to claim 15, wherein the fluid delivering device is one of a water hose and a compressed gas hose to allow fluid to move from the assembly to an end of the drain line.

* * * * *